(12) United States Patent
Cormack et al.

(10) Patent No.: US 8,660,909 B2
(45) Date of Patent: Feb. 25, 2014

(54) FUEL STOP ANALYZER SYSTEM AND METHOD

(75) Inventors: Roberto Nicholas Cormack, Cypress, TX (US); John Legh-Page, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 554 days.

(21) Appl. No.: 12/904,843

(22) Filed: Oct. 14, 2010

(65) Prior Publication Data

US 2011/0107247 A1    May 5, 2011

Related U.S. Application Data

(60) Provisional application No. 61/251,482, filed on Oct. 14, 2009.

(51) Int. Cl.
G06Q 30/00 (2012.01)
G06Q 30/06 (2012.01)
G06Q 30/02 (2012.01)

(52) U.S. Cl.
CPC ........ *G06Q 30/0627* (2013.01); *G06Q 30/0283* (2013.01)
USPC ...................................... 705/26.63

(58) Field of Classification Search
USPC .................. 705/26.61, 26.1, 26.63
See application file for complete search history.

(56) References Cited

U.S. PATENT DOCUMENTS

| | | | | |
|---|---|---|---|---|
| 3,153,143 A * | 10/1964 | Fogarty | ......................... | 701/123 |
| 2002/0022909 A1 * | 2/2002 | Karem | ............................. | 701/3 |
| 2004/0225953 A1 * | 11/2004 | Rank et al. | ..................... | 715/500 |
| 2007/0095890 A1 * | 5/2007 | Elefant | ......................... | 235/378 |
| 2008/0243663 A1 * | 10/2008 | Eveland | ........................ | 705/35 |

* cited by examiner

*Primary Examiner* — Amee A Shah
(74) *Attorney, Agent, or Firm* — Donna P. Suchy; Daniel M. Barbieri

(57) ABSTRACT

A system and method of providing fuel pricing quotes for air travel trip having at least two trip legs. Via the system, a user is able to quickly and automatically retrieve fuel pricing quotes, thereby bypassing the time-consuming process of drawing up a flight plan and figuring out where and when to refuel in light of such variables as aircraft endurance, fuel economy, safety, and the numerous options in refueling locations.

14 Claims, 6 Drawing Sheets

| FUEL STOP ANALYZER | | | | | — 200 |
|---|---|---|---|---|---|

| AIRPORT SELECT FORM | 204 | | | 202 | |
|---|---|---|---|---|---|
| DEPARTURE ICAO/IATA:* | KHPN | ✈ WHITE PLAINS, NEW YORK UNITED STATES | | LEG DISTANCE: 2966.4 (NM) | — 208 |
| ARRIVAL ICAO/IATA:* | EGGW | ✈ LONDON, UNITED KINGDOM | | LEG TIME: 6:42 (HH:MM) | |

| AIRPORT DETAILS | 214 | | | 212 | |
|---|---|---|---|---|---|
| AIRCRAFT | SELECT AN AIRCRAFT ▼ | AIRCRAFT TYPE:* | GULFSTREAM 450-4350 (NM) | | |
| MAX ENDURANCE: 4350 (NM) — 218 | | AIR SPEED:* | 460 (KTS) — 210 | 216 | |

| FILTER - CRITERIA | | | | 220 |
|---|---|---|---|---|
| ⦿ DISTANCE IN NM FROM KHPN | 1483.2 | TO | 2966.4 — 222 | |
| ○ TIME IN HH:MM FROM KHPN | | TO | ▼ — 224 | |

| AIRPORT FILTER | 228 INCLUDE | 236 | 234 | |
|---|---|---|---|---|
| ☑ FILTER TO IN RANGE OF ARRIVAL AIRPORT | | RUNWAY LENGTH AT LEAST:* | 6000 (FEET) | |
| ☑ FILTER TO AIR ROUTING PREFERRED FUEL STOP⊞ — 230 | | ☐ INCLUDE MILITARY AIRPORTS — 238 | | |
| ☐ FILTER TO HISTORIC AIRPORTS ★ — 232 | | ☑ FUEL PRICE FAR TYPE: ⦿ 91 ○ 135 — 240 | | |

| SELECT THE RANGE DISTANCE | | | | 242 |
|---|---|---|---|---|
| ⦿ 250 (NM) | ○ 500 (NM) | ○ 750 (NM) | ○ OTHER ☐ (NM) — 246 | |
| | | 244 — SUBMIT RESET | | |

FUEL STOP ANALYZER SYSTEM AND METHOD

CROSS-REFERENCE TO RELATED APPLICATIONS

The present application claims priority to U.S. Provisional Pat. App. No. 61/251,482 entitled "Fuel Stop Analyzer System and Method," filed on Oct. 14, 2009, the contents of which are hereby incorporated by reference to the extent not inconsistent with the present disclosure.

BACKGROUND

In the area of private air travel, prior to departure travelers are required to create and file a flight plan with the local Civil Aviation Authority (e.g., the Federal Aviation Administration in the USA). A flight plan typically includes basic information such as departure and arrival points, estimated time en route, alternate airports in case of bad weather, type of flight (whether instrument flight rules or visual flight rules), pilot's name and the number of people on board, etc. For longer flights, the traveler must also be generally familiar with the limits of the aircraft being used, for example aircraft manufacturer specifications regarding preferred flight speeds, maximum cargo capacity, and the maximum fuel range of the aircraft. Unless the traveler is largely familiar with the limits of the aircraft, a significant amount of research and investigation may be required to obtain the needed information so as to ensure a safe trip that does not include unanticipated stops. This research may encompass discussions with individuals having a seasoned amount of knowledge about the particular aircraft, flight dispatchers, and even aircraft manufacturers.

In the event an air travel trip requires a stop to re-fuel the aircraft en route to the destination, the traveler would then be compelled to research potential fuel stops along the desired flight path for a suitable airport. Variables such as runway length, fuel availability, fuel pricing, distance from the intended flight path, etc., all play a vital role in determining the most efficient time and place a traveler should stop. Especially in foreign countries, researching these fuel pricing variables can be quite tedious and generally time consuming. In some cases, fuel pricing can be a major factor in determining where to stop. For example, depending on the country or region, fuel pricing at one airport may be significantly more expensive than a geographically-adjacent airport. As can be appreciated by those familiar with private air travel, electing to make a fuel stop at a location where fuel is less expensive can potentially save a considerable amount of money, thus reducing the overall cost of the air travel trip.

What is needed, therefore, is a system that allows a user to bypass the time-consuming researching and investigative aspects required in fuel stop flight planning and instead provide that information to the user instantaneously.

SUMMARY

Embodiments of the disclosure may provide a system for providing a fuel price quote for at least one air travel trip having at least two trip legs. The system may include at least one user interface configured to allow a user to input a fuel price request including filter criteria related to the at least two trip legs, and a fuel analyzing system communicably coupled to the at least one user interface via a network and configured to receive and process the fuel price request according to the filter criteria. The system may further include at least one database communicably coupled to the fuel analyzing system for storing and updating air travel data, and a data engine communicably coupled to the fuel analyzing system and configured to access the air travel data in the at least one database and process the fuel price request into the fuel price quote, wherein the fuel price quote includes aircraft fuel pricing available at airports located along the at least two trip legs that match the filter criteria inputted by the user. The system may also include a render engine communicably coupled to the fuel analyzing system and configured to convert the fuel price quote into at least one graphic image viewable on the at least one user interface.

Embodiments of the disclosure may further provide a method of providing a fuel price quote to a user for at least one air travel trip having at least two trip legs. The method may include entering a fuel price request to a fuel analyzing system having a data engine and a render engine, the fuel price request being entered via a user interface communicably coupled to the fuel analyzing system via a network, wherein the fuel price request comprises filter criteria related to the at least two trip legs, and querying at least one database communicably coupled to the fuel analyzing system to retrieve air travel data. The method may further include processing the air travel data with the data engine in conjunction with the filter criteria to obtain a fuel price quote comprising aircraft fuel pricing available at one or more potential fuel stops located along the at least two trip legs, and displaying the fuel price quote to the user using the render engine, the fuel price quote comprising at least one graphic image viewable on the user interface.

Embodiments of the disclosure may further provide a method of providing a fuel price quote for air travel. The method may include accessing a fuel analyzing system with a user interface communicably coupled thereto via a network, and entering a fuel price request on a first graphical user interface provided by the fuel analyzing system. Entering the fuel price request may include choosing a departure city and a destination city, selecting an aircraft from a list of generic or saved aircraft, selecting to limit potential refueling location search results to a defined geographic corridor surrounding one or more trip legs between the departure and destination cities, and submitting the fuel price request to the fuel analyzing system. The method may further include retrieving a fuel price quote on a second graphical user interface, the fuel price quote comprising aircraft fuel pricing available at one or more potential fuel stops located between the departure and destination cities.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2 illustrates a graphical user interface where a user is able to input various filter criteria into the system, according to one or more embodiments of the disclosure.

DETAILED DESCRIPTION

Figure 1:
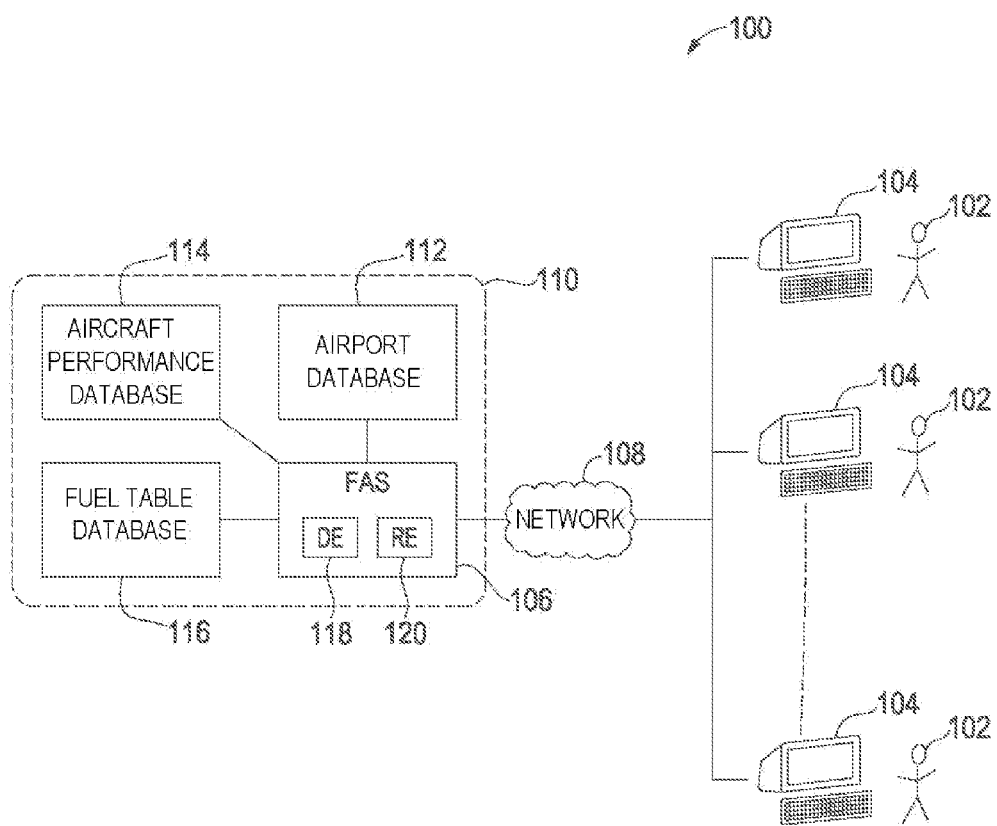
FIG. 1 illustrates a schematic of the fuel stop analyzer system, according to one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. In the following discussion and in the claims, the terms "including" and "comprising" are used in an open-ended fashion, and thus should be interpreted to mean "including, but not limited to." Any and all numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The disclosure may include a computer system having hardware capable of storing and managing machine-readable instructions, as well as the software for executing the machine-readable instructions to produce a desired result. Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards.

Software includes any machine code stored in any memory medium, such as RAM or ROM, and machine code stored on other devices, such as floppy disks, flash memory, hard drives, network drives, or a CD-ROM. Software may include source or object code, for example. In addition, software encompasses any set of instructions capable of being executed in a client machine or server. Software may include one or more logical units known as modules.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit including custom VLSI circuits or gate arrays, off-the-shelf semiconductors such as logic chips, transistors, or other discrete components, as are known in the art. One or more of the modules may also be implemented in programmable hardware devices such as field programmable gate arrays, programmable array logic, programmable logic devices or the like.

In an exemplary embodiment, one or more of the modules may be implemented in software for execution by various types of processors. An identified module of executable code may, for instance, include one or more physical or logical blocks of computer instructions that may be organized as an object, procedure, or function. Further, the executables of an identified module need not be physically located together but may include disparate instructions stored in different locations that, when joined logically together, include the module and achieve the stated purpose for the module. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

In some embodiments, higher-level components may be used as modules. For example, one module may include an entire computer acting as a network node. Another module may include of an off-the-shelf or custom program, such as a database management system. These higher-level modules may be decomposable into smaller hardware or software modules corresponding to different parts of a software program and identifiable chips (such as memory chips, ASICs, or a CPU) within a computer.

One type of module is a "network." A network module defines a communications path between endpoints and may include an arbitrary amount of intermediate modules. A network module may encompass various pieces of hardware, such as cables, routers, and modems, as well the software necessary to use that hardware. Another network module may encompass system calls or device-specific mechanisms such as shared memory, pipes, or system messaging services. A third network module may use calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

Combinations of software and hardware may be used for providing enhanced functionality and performance for certain embodiments of the present disclosure. One example is to directly provide fuel pricing for air travel trips involving at least two legs. Accordingly, it should be understood that combinations of hardware and software are also included within the definition of a computer system and are thus envisioned by the present disclosure as possible equivalent structures and equivalent methods.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

In at least one embodiment, the present disclosure may be designed to work on any specific architecture. For example, the system may be executed on a single computer, through local area networks, client-server networks, wide area networks, internets, hand-held and other portable and wireless devices and networks. The methods described herein may be implemented using software encoded on a computer-readable medium. Further, methods described herein may also be implemented using hardware configured to carry out the methods.

A database, as described herein, may be any standard or proprietary database software, such as Oracle, Microsoft Access, SyBase, or DBase II, for example. The database may have fields, records, data, and other database elements that may be associated through database specific software. Additionally, data may be mapped, or associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. It is to be understood that more than one database may be implemented.

Referring now to FIG. 1, illustrated is a system 100 for providing to at least one user 102 a fuel price quote for an air travel trip heading to one or more destinations across the world. In at least one embodiment, the air travel trip will involve at least two trip legs. The term "leg" refers to a trip segment between any two airports. For example, if an aircraft travels from Houston, Tex. to Rio de Janeiro, Brazil through Panama City, Panama, the entire trip has two legs, which is the one from Houston to Panama City, and the other from Panama City to Rio de Janeiro. The system 100 may be configured to provide the user 102 with aircraft fuel information available at airports located along each leg of an air travel trip, thereby allowing the user 102 to plan where and when it would be best or otherwise most efficient to refuel. As will be seen, however, the present disclosure equally functions on trips constituting a single leg, wherein the system 100 may provide a user 102 with a fuel quote from a departure airport to a single arrival point.

The system 100 may be accessed by one or more users 102 using a user interface 104. The user interface 104 may include, but is not limited to, a desktop computer or a mobile computing device. In an exemplary embodiment, the user interface 104 may include a CPU and memory that may have an operating system ("OS") that controls the operation of the user interface 104. The OS may be a Microsoft Windows® OS, but in other embodiments, the OS may be any kind of operating system, including without limitation any version of the Linux® OS, any version of the Unix® OS, or any other conventional OS known in the art.

In an exemplary embodiment, a user 102 may provide the user interface 104 with input using any conventional peripheral adapted to receive input and provide it to the OS, including without limitation, a keyboard, mouse, and touch screen module. In turn, the user interface 104 may provide the user 102 with output using any conventional peripheral adapted to provide output from the OS to the user 102, including without limitation a printer, a monitor, audio speakers, etc. As will be described in more detail below, the monitor may provide the user 102 with at least one graphical user interface (GUI), enabling the user 102 to interactively communicate with the system 100.

The user interface 104 may be communicably coupled to a Fuel Analyzing System (FAS) 106 via a network 108. In one embodiment, the network 108 is the Internet. In other embodiments, however, the network 108 may include an intranet or any other network known in the art and capable of transmitting data. The FAS 106 may be housed in a central location, such as an Operational Center (OC) 110, and maintained by a flight operations service provider. Within the OC 110, the FAS 106 may be communicably coupled one or more databases, also maintained by the flight operations service provider, and configured to store and update air travel data. For example, the FAS 106 may be communicably coupled to an airport database 112, an aircraft performance database 114, and a fuel table database 116. In other embodiments, however, the OC 110 may include other databases configured to fit a particular application. The databases 112, 114, and 116 may contain or otherwise store various air travel data including, but not limited to, airport information, aircraft information, and aircraft fuel pricing information, respectively. In at least one embodiment, the databases 112, 114, 116 may all be combined into a single database.

The airport database 112 may include data related to one or more airports across the globe and configured to store said data and update it periodically as needed. In an exemplary embodiment, the airport database 112 may include airport information that can be automatically pulled or otherwise drawn upon and processed by the FAS 106. Such information may include airport latitude/longitude data, available runway information, airport contact information, available fuel suppliers and vendors at each airport, available airport services, ground handling services, and available maintenance services. As can be appreciated, many other types of airport-related data can be stored and provided in the airport database 112 to fit particular applications.

The aircraft performance database 114 may include manufacturer-supplied aircraft information relating to a plurality of aircraft. The information stored in the aircraft performance database 114 may be pulled or otherwise drawn upon and processed by the FAS 106 when requested. In at least one embodiment, the aircraft performance database 114 stores fuel burn information for various aircrafts that may be selected to carry out an air travel trip. Fuel burn information is vital in calculating the overall endurance of a specific aircraft over a particular length of an air travel trip leg. For example, the amount of fuel expended for each leg depends greatly on the aircraft used, thereby potentially altering the feedback ultimately given to the user 102. In at least one embodiment, the aircraft performance database 114 may include fuel burn values for short-leg air travel trips (i.e., trips typically less than or equal to one hour), long-leg air travel trips (i.e., trips typically greater than six hours), and medium-leg air travel trips (i.e., trips falling between short and long legs).

The fuel table database 116 may include fuel data from aircraft fuel vendors, or fixed base operators (FBO), at airports around the globe. As is known in the industry, an FBO is a vendor or service center at an airport that, at a minimum, offers aircraft fuel. The fuel pricing for each FBO in the fuel table database 116 may be continuously updated via various methods. For example, the fuel table database 116 may receive weekly fuel schedules directly from each FBO, or a computer may be programmed to download weekly fuel pricing information from a vendor's website. In some cases, it may be necessary to directly contact the FBO via electronic mail, telephonic communication, or other means to obtain current fuel pricing. In at least one embodiment, the fuel table database 116 may be updated at least once a week. The fuel table database 116, therefore, may be configured to compile and continuously update fuel pricing offered by each FBO at airports around the world. As is described in more detail below, the user 102 may be given the option to select services, such as fuel provisions, from the various FBO's at any given airport along the air travel trip route based on fuel pricing.

In an exemplary embodiment, the FAS 106 may include a software Data Engine (DE) 118 for retrieving and processing the data stored in the databases 112, 114, and 116, and a software Render Engine (RE) 120 that is responsible for graphical or animation data processing. The RE 120 may be adapted to processing graphic images such as a geographic map 400 (FIG. 4), and several other graphical user interfaces, as described below. In at least one embodiment, the RE 120 may be configured to process, or convert, the results of the data processing undertaken by the DE 118 into visible graphic images for user 102 reference via the user interface 104. Accordingly, a user 102 may then be able to access the information on the FAS 106 through the network 108 via the user interface 104.

Figure 3A:
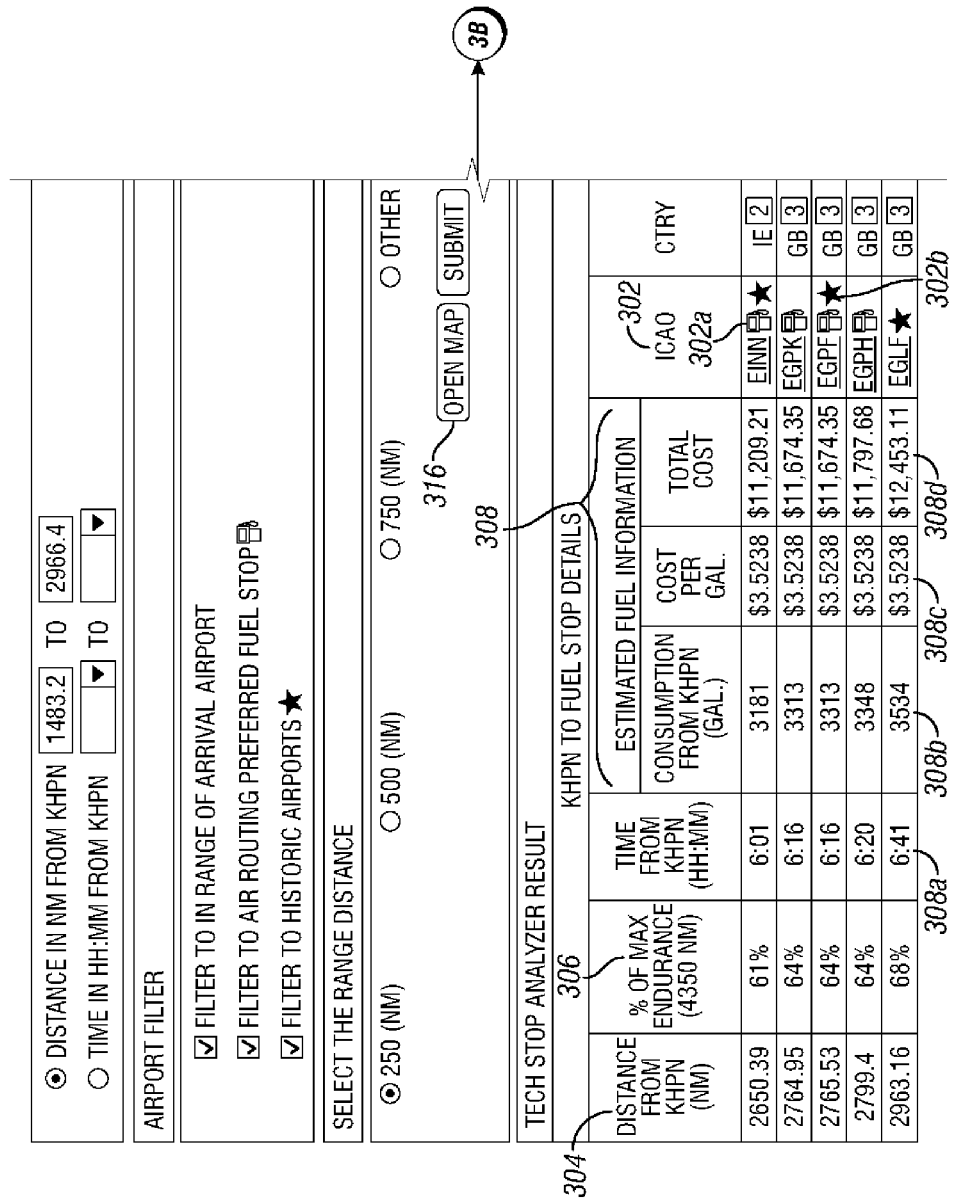
FIG. 3A illustrates a first part of a graphical user interface displaying the results of a fuel pricing request search, according to one or more embodiments of the disclosure.

In order to provide a user 102 with a fuel quote for an air travel trip involving at least two trip legs, the FAS 106 may be configured to collect and process a fuel quote request from the user 102 through the network 108. By way of linked computer-generated visual displays, commonly identified as pages, windows or screens, which have an integrated graphic user interface (GUI) provided by the RE 120 of the FAS 106, the user 102 can input and view information processed on the FAS 106. As illustrated in FIGS. 2 through 4, at least a few types of GUI screens are available for entering and viewing trip and fuel pricing-related information that may be submitted to the FAS 106 for processing.

Referring to FIG. 2, illustrated is a fuel stop analyzer GUI 200 through which a user 102 is able to manually input filter criteria, or various pieces of flight information corresponding to at least one air travel trip, and ultimately retrieve fuel stop pricing and information for the air travel trip. At least one filter criteria provided by the GUI 200 includes an Airport Select Form 202 module where a user 102 can manually input the desired departure and destination airports 204 using industry-known ICAO (International Civil Aviation Organization) codes. As shown in the illustrated embodiment, ICAO codes KHPN and EGGW for White Plains, N.Y., United States, and London, United Kingdom, respectively, have been entered as exemplary departure and arrival airports. As will be appreciated, it is also within the scope of the present disclosure to employ a pull-down menu where the user 102 may choose from a comprehensive listing of ICAO codes to select the desired airport.

Once departure and arrival airports have been selected, the DE 118 in the FAS 106 may be configured to automatically calculate the leg distance 206 between the two selected airports. In one embodiment, this is accomplished by pulling latitude/longitude information for the respective airports from the airport database 112 and determining the global distance between the two airports. In the illustrated embodiment, for example, the calculated leg distance 206 from White Plains to London is 2,966.4 nautical miles (NM).

The DE 118 may also determine or otherwise calculate the leg time 208, or the flight time from departure to arrival. The leg time 208 may be calculated using the preferred air speed 210 that, in at least one embodiment, is automatically supplied by the FAS 106 and entered into the GUI 200 at 210. The preferred air speed 210 is a typical air speed where, on average, an aircraft can achieve optimum fuel efficiency. However, at the risk of decreasing overall fuel efficiency, a user 102 may manually change the preferred air speed 210, thereby altering the calculated leg time 208. This may prove advantageous in scenarios where a shorter leg time 208 is needed to meet a particular itinerary. In the illustrated embodiment, the preferred air speed 210 provided by the FAS 106 is 460 knots, therefore, the leg time 208 to travel from KHPN to EGGW is calculated to be about six hours and forty-two minutes.

At least another filter criteria available in the fuel stop analyzer GUI 200 may include an Aircraft Details module 212, wherein a user 102 may select which aircraft will be used for the air travel trip. The user 102 may have the option to either select an aircraft from a fleet of known aircraft 214 or from a listing of generic aircraft 216. To be able to select an aircraft from the fleet of known aircraft 214, the user 102 would have previously stored this information in the FAS 106. Thus, upon logging onto the system 100 anew, information corresponding to the particular user 102, including all known aircraft 214, would be automatically refreshed and available to the user 102 to select from. If a user 102 does not have a known fleet of aircraft to choose from, a generic aircraft may be selected from the listing of generic aircraft 216 provided by the flight operations service provider. The listing 216 may include aircraft makes and models from aircraft manufacturers around the world. In an exemplary embodiment, the listing of known aircraft 214 and generic aircraft 216 may be embodied in a drop-down menu feature. The menu feature may allow the user to search each type of aircraft in a scroll-bar fashion, as known in the art.

In either case, once a desired aircraft is selected, the FAS 106 may be configured to automatically pull maximum endurance 218 information for the chosen aircraft from the aircraft performance database 114 (FIG. 1). The aircraft's maximum endurance 218 corresponds to the maximum distance the selected aircraft is capable of flying without requiring a refueling stop. In the illustrated embodiment, for example, a Gulfstream® 450 aircraft has been selected from the listing of generic aircraft 216. The maximum endurance 218 of the Gulfstream® 450 is 4,350 nautical miles, as provided by the manufacturer and derived from the performance database 114.

Another filter criteria that may be added by the user 102 is a Filter-Criteria module 220, where the user 102 manually enters an approximate refueling stop distance 222 or approximate refueling stop time 224 corresponding to a selected stop distance or stop time after departure. This feature may prove advantageous to a user 102 who is familiar with the selected aircraft and can therefore approximate the aircraft's maximum endurance 218 better than the manufacturer, whose determination is typically based on best-case scenario flying conditions. Thus, a user 102 may decide to filter the search results to refueling locations that are a certain distance 222 or time 224 away from the departure city. It may also prove advantageous for a user 102 who wishes simply stop to refuel after a certain amount of flight time has elapsed, notwithstanding the maximum endurance 218 of the selected aircraft.

Employing the filter criteria of the Filter-Criteria module 220 effectively limits the fuel stop search results to only those refueling locations located within either the selected distance gap 222 or selected time frame 224. If this filter were not employed, all potential refueling locations along the route would be returned to the user 102, even those located directly after the departure airport where it would be clearly inefficient or imprudent to refuel. Therefore, in an exemplary embodiment, the FAS 106 may be configured to automatically insert a minimum refueling stop distance 222 equaling half the distance of the total leg distance 206 so as to eliminate all potential refueling locations before the half-way point of the particular trip leg. If desired, the user 102 may manually change this distance 222, as described above. In the illustrated embodiment, the minimum refueling stop distance 222 is set at 1483.2 nautical miles from the arrival airport. In other words, the FAS 106 will filter potential refueling destinations to within 1483.2 nautical miles from the arrival airport along the trip leg.

Another filter criteria that may be included in the fuel stop analyzer GUI 200 is an Airport Filter module 226, configured to allow the user 102 to further filter the fuel stop search results. In one embodiment, the Airport Filter 226 may allow the user 102 to filter the search results to the Range of Arrival Airport 228. In other words, by selecting to filter the results by Range of Arrival Airport 228, the FAS 106 will only retrieve refueling locations located within the maximum endurance 218 distance from the destination airport, thereby guaranteeing that at least one adequate fuel stop will be located within the maximum flight distance of the arrival airport by the selected aircraft.

The Airport Filter 226 may also be configured to filter the search results to Preferred Fuel Stops 230 selected by the flight operations service provider. When Preferred Fuel Stops 230 is selected, the fuel stop search results will only display airports openly recommended by the particular flight operations service provider. For example, some airports may be favored over others for several reasons as a result of historical contact with those airports. At least some reasons may include the overall customer service provided at the airport, service availability, and historic fuel pricing. This preference may also be determined by current travel threat levels, resulting from localized political unrest, natural disasters, etc. This may prove advantageous in instances where the user 102 wishes to refuel only at trusted and safe airports along the trip leg. As illustrated in FIGS. 2 and 3A, an icon (such as the fueling icon shown at 230 in FIGS. 2 and 302a in FIG. 3A) indicates a Preferred Fuel Stop 230 in the search results.

The Airport Filter 226 may also allow a user 102 to filter the search results to Historic Airports 232. In other words, by selecting Historic Airports 232, the search results will automatically be filtered to only display airports where the user 102 has already visited, and therefore has familiarity therewith. Again, as illustrated in FIGS. 2 and 3A, an icon (such as the star shown at 232 in FIGS. 2 and 302b in FIG. 3A,) may indicate a Historic Airport 232 in the search results.

Also included in the fuel stop analyzer GUI 200 as another filter criteria may be an Include module 234 configured to allow the user 102 to further tailor and the filter fuel stop search results. In the Include module 234, the user 102 may filter search results to airports with a minimum runway length 236. Since all aircraft do not stop or take off in the same distance, the minimum runway length filter 236 allows the user 102 to tailor the fuel stop search results to the stopping ability of a specific aircraft model. As indicated in FIG. 2, the fuel stop search results will be filtered to exclude any airports that do not have at least one runway with a length of at least 6,000 feet. In an exemplary embodiment, the system 100 may be programmed to automatically input a default runway length 236 of 6,000 feet, since this distance generally represents the average stopping distance for private aircraft. The user 102, however, may always have the option to manually change this length.

The Include module 234 may further allow the user 102 to filter the fuel stop search results to include or omit any military airports 238. By default, the system 100 may be programmed to automatically exclude all military airports, U.S.-based and international, in the fuel stop search results. Nevertheless, this feature may be manually engaged by the user 102.

The Include module 234 may also allow the user 102 to filter the fuel stop search results corresponding to particular fuel pricing 240 schemes. In particular, the user 102 may define under Federal Aviation Regulations (FAR) whether the current flight will be a private flight ("91") or a charter flight ("135"), which may have a substantial impact on taxes and/or fees at various fuel stops around the world. For example, in Germany a user 102 may possibly not be charged a mineral fee if the flight is a charter flight ("135"), thus potentially saving the user 102 a full $1.00 per gallon in fuel costs. As can be appreciated, such a fee reduction can save a user 102 a significant amount in fuel costs. De-selecting the fuel pricing 240 filter will provide the user 102 with all fuel quotes regardless of the type of flight.

Lastly, another filter criterion that may be included in the fuel stop analyzer GUI 200 is a Range Distance module 242 configured to graphically provide the user 102 with a corridor, or tunnel, of potential fuel stops along the trip leg route. Briefly, the Range Distance filter 242 allows the user 102 to create a corridor 406 (see FIG. 4), defined by the specific dimension chosen, that places distance limitations on where potential fuel stop airports will be searched and retrieved. In FIG. 2, a corridor distance of 250 nautical miles (NM) is selected. This distance directly corresponds to a distance of 250 NM laterally-offset from both sides of the trip leg route, thus creating a filter corridor 406 (FIG. 4) of 500 NM wherein potential refueling airports will be searched. By so doing, the Range Distance filter 242 directs the FAS 106 to disregard all potential fuel stops that lie outside of the defined corridor 406. As illustrated, a user 102 may have the option to choose alternative distances for the corridor 406, or otherwise manually input a specific corridor distance.

Once a user 102 has inputted all the filter criteria, clicking the submit button 244 will initiate the FAS 106 to process the request. Alternatively, if the user 102 desires to start over with completely new filter criteria, the reset button 246 is clicked and new criteria parameters may then be added.

Figure 3B:
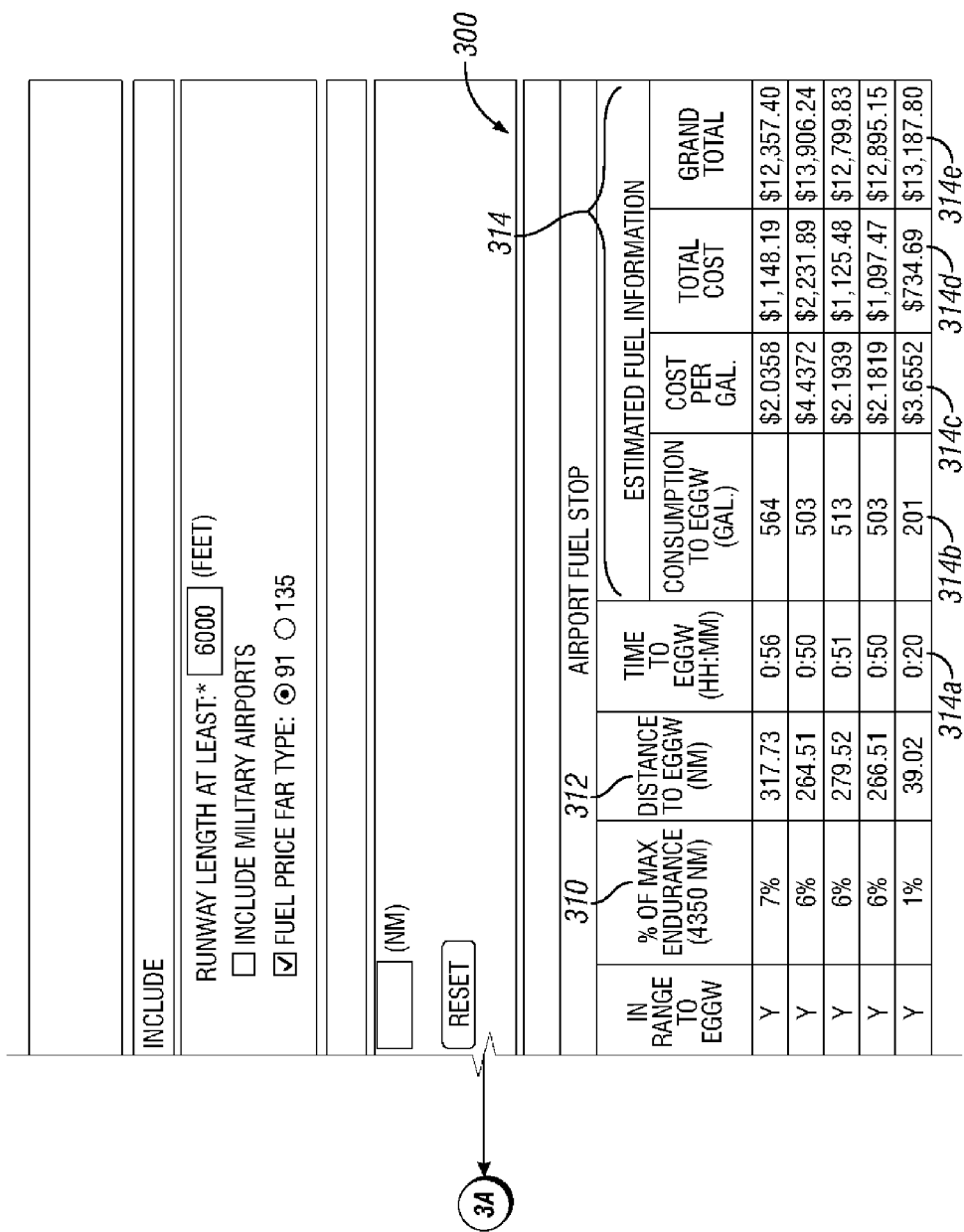
FIG. 3B illustrates a second part of the graphical user interface displaying the results of the fuel pricing request search, according to one or more embodiments of the disclosure.
Figure 4:
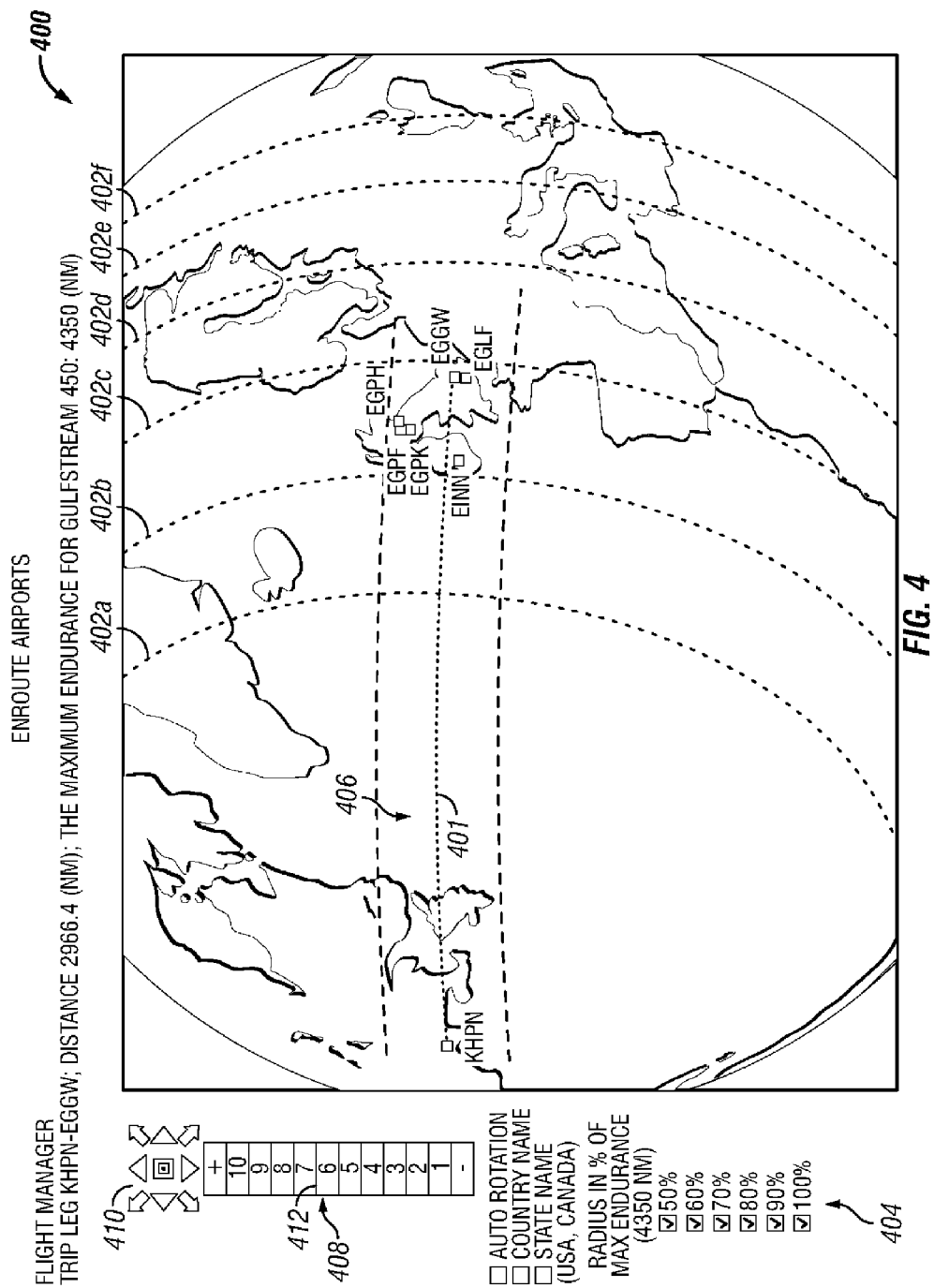
FIG. 4 illustrates a graphical user interface of a geographic map of the at least one air travel trip from departure to destination, including potential fuel stops along the route, according to one or more embodiments of the disclosure.

FIGS. 3A and 3B illustrate a graphical user interface displaying the results of a fuel pricing request in two parts, according to one or more embodiments of the disclosure. It should be noted that the fuel stop analyzer system 100 may not display the results of the fuel pricing request in two parts as illustrated in FIGS. 3A and 3B, but may provide the results in a single display. Herein, the results are displayed in two parts (FIGS. 3A and 3B) for the sake of clarity. FIG. 3A illustrates a first part of a graphical user interface displaying the results of a fuel pricing request search, according to one or more embodiments of the disclosure. FIG. 3B illustrates a second part of the graphical user interface displaying the results of the fuel pricing request search, according to one or more embodiments of the disclosure. Referring now to FIGS. 3A and 3B, upon processing the fuel quote request filled out in GUI 200, the FAS 106 may provide the user 102 with a Tech Stop Analyzer Result GUI 300, as shown in the lower-half of FIGS. 3A and 3B FIG. 3-*and* displaying several columns of data. The Result GUI 300 may include at least one ICAO airport code column 302 listing the potential fuel stop airports along the trip route that match the above-described search criteria. In particular, the airports listed may include those that lie along the selected route and within the corridor 406 (FIG. 4) previously defined by the user 102, as described above in reference to the Range Distance filter 242. To retrieve further information for any of the resulting airports, the user 102 may pass the cursor over a particular ICAO code in the code column 302, thereby causing a pop-up box to appear (not shown). The pop-up box may contain information retrieved from the airport database 112 (FIG. 1) such as but not limited to the full name of the airport, its geographic location in longitudinal/latitudinal coordinates, the airport's maximum runway length, and the airport's elevation. For user 102 reference, the ICAO airport code column 302 may also display the preferred fuel stop and historic airport icons 302*a*, 302*b*, respectively, as described above with reference to FIG. 2.

The Analyzer Result GUI 300 may also include columns displaying the distance from the departure airport 304, percent (%) of maximum endurance 306, and several columns displaying estimated fuel information 308. The distance from departure airport column 304 may be configured to display the distance in nautical miles from the departure airport to the corresponding fuel stop airport shown in the ICAO airport code column 302, as displayed in the same row. For example, to reach potential fuel stop ICAO code EGPF (corresponding to the airport in Glasgow, United Kingdom), the distance from ICAO code KHPN (corresponding to White Plains, N.Y., USA) is 2765.53 NM.

The % of maximum endurance column 306 may be configured to display what percentage of maximum fuel endurance 218 the selected aircraft 214, 216 (FIG. 2) will be required to commit to reach the corresponding potential fuel stop shown in the same row. For example, continuing with the scenario above, the selected Gulfstream 450 aircraft is calculated to consume approximately 64% of its fuel traveling from KHPN to EGPF.

The estimated fuel information columns 308 display fuel information corresponding to the trip leg from the departure airport to the potential fuel stop airport. For example, the estimated fuel information columns 308 may include columns displaying travel time 308*a*, fuel consumption 308*b*, fuel cost per gallon 308*c*, and total fuel cost 308*d*, all tied to the leg between the departure airport and the potential fuel stop indicated in the respective row. The travel time column 308*a* displays the estimated travel time from the departure airport to the potential fuel stop shown in the same row. This calculation may be derived from the preferred air speed 210 (FIG. 2) entered previously in the filter criteria.

The fuel consumption column 308*b* may be configured to display the estimated total gallons of fuel to be consumed during travel from the departure airport to the potential fuel stop shown in the same row. This calculation is derived not only from the preferred air speed 210 (FIG. 2), but also from the aircraft type 214, 216 (FIG. 2) which is directly tied to the manufacturer's fuel consumption specifications pulled from the aircraft performance database 114 by the FAS 106 (FIG. 1).

The fuel cost per gallon column 308*c* may be configured to display the current fuel prices available at the departure airport, as derived from the fuel table database 116 by the FAS 106 (FIG. 1). By a simple multiplication between the data in columns 308*b* and 308*c*, the total fuel cost column 308*d* displays the total fuel cost the user 102 can be expected to pay from the departure airport to the potential fuel stop shown in the ICAO airport code column 302, as displayed in the same row. Continuing with the scenario above, the user can be expected to pay $11,674.35 in fuel expenses by traveling from KHPN to EGPF.

The Analyzer Result GUI 300 may also include several columns displaying air travel information corresponding to the trip leg between the fuel stop and the destination airport, if needed. As illustrated, the Analyzer Result GUI 300 may further include another % of maximum endurance column 310, a distance to destination airport column 312, and several columns displaying estimated fuel information 314, all related to the trip leg from the fuel stop 302 to the destination airport. Again, the % of maximum endurance column 310 may display what percentage of maximum fuel endurance the selected aircraft will be required to commit to reach the destination airport from the corresponding potential fuel stop shown in the ICAO airport code column 302 as displayed in the same row. The distance to destination airport column 312 displays the distance to the destination airport from the corresponding fuel stop airport shown in the ICAO airport code column 302 as displayed in the same row. Continuing with the example from above, the selected Gulfstream 450 aircraft is calculated to burn approximately 6% of its fuel traveling from EGPF to EGGW (London, United Kingdom), a distance of 279.52 NM.

The estimated fuel information columns 314 display fuel information corresponding to the trip leg from the potential fuel stop airport 302 to the destination airport. The estimated fuel information columns 314 may include columns displaying travel time 314*a*, fuel consumption 314*b*, fuel cost per gallon 314*c*, total fuel cost 314*d*, and a fuel cost grand total 314*e*. The travel time column 314*a* displays the estimated travel time to the destination airport from the potential fuel stop 302 shown in the same row. The fuel consumption column 314*b* displays the estimated gallons of fuel to be consumed during travel to the destination airport from the potential fuel stop airport 302 shown in the same row.

The fuel cost per gallon column 314*c* displays current fuel pricing per gallon available at the potential fuel stop airports shown in the ICAO airport code column 302, as pulled from the fuel table database 116 by the FAS 106 (FIG. 1). As simple multiplication between the data in columns 314*b* and 314*c*, the total fuel cost column 314*d* displays the total fuel cost a user 102 can be expected to pay from the potential fuel stop 302 to the destination airport. The fuel cost grand total column 314*e* adds the total fuel cost columns 308*d*, 314*d* for each leg of the trip to provide the user 102 with an approximate fuel cost for the complete trip from departure to destination.

Continuing with the example from above, an air travel trip leaving from KHPN (White Plains, N.Y.), stopping in EGPF (Glasgow, United Kingdom) to refuel, and finally arriving at EGGW (London, United Kingdom) will cost the user 102 approximately $12,799.83 in fuel expenses, as shown in the fuel cost grand total column 314e. As can be appreciated, providing the user 102 with fuel pricing data for a plurality of potential fuel stops along the trip leg allows the user 102 to select the most economical route. In so doing, the user 102 will not only be able to plan a fuel efficient trip, but also save a considerable amount in fuel expenses.

In an exemplary embodiment, a user 102 may also be able to graphically view the proposed air travel trip on a globe by clicking on the "Open Map" button 316 located in the Analyzer Result GUI 300. Referring now to FIG. 4, illustrated is a geographic map GUI 400 displaying at least one air travel trip route 401 from departure to destination. The map GUI 400 may be generated, at least in part, using the RE 120 in the FAS 106 (FIG. 1). As illustrated, the air travel trip route 401 departs from ICAO airport code KHPN and arrives at ICAO airport code EGGW.

The geographic map GUI 400 may include a plurality of concentric endurance lines 402 (402a-402f), all radially-offset from the exemplary departure airport, and each representing a different percent maximum fuel endurance for the selected aircraft (see 214, 216 in FIG. 2). In other words, the endurance lines 402a-f represent the percentage of fuel burn where the selected aircraft can be expected to travel on a single tank of fuel. For example, endurance line 402a may indicate 50% of the maximum fuel endurance of the selected aircraft, meaning once the aircraft reaches endurance line 402a, the fuel for the aircraft will be approximately 50% spent. Similarly, endurance line 402b may indicate 60% maximum fuel endurance of the aircraft, line 402c may indicate 70%, and so on until endurance line 402f which may indicate 100% of the maximum fuel endurance of the selected aircraft.

The endurance lines 402a-f may be automatically generated by the FAS 106 by accessing the specific aircraft endurance information from the Aircraft Performance Database 114. For user 102 convenience, the endurance lines 402a-f may be manually manipulated (i.e., added to or removed from the map GUI 400) by clicking on the respective percentage options 404.

In at least one embodiment, the endurance lines 402a-f may be color-coded to indicate the severity of the fuel level. For example, lines 402e and 402f, representing 90% and 100% maximum fuel endurance, respectively, may be colored red to indicate to the user 102 a severe risk of depleting fuel resources. On the other hand, endurance lines 402a and 402b, representing 50% and 60% maximum fuel endurance, respectively, may be colored green indicating that the selected aircraft should have no problem reaching that radial point with the fuel capacity of the selected aircraft 214, 216 (FIG. 2). As can be appreciated, being able to visualize the distance from the destination airport in conjunction with where and when the selected aircraft 214, 216 (FIG. 2) is anticipated to consume a projected amount of fuel, allows a user 102 to make an informed decision of where it may be necessary to stop for refueling along the route 401.

Also depicted in the map GUI 400 is the corridor 406, or tunnel, as described above with reference to the Range Distance filter 242 (FIG. 2). To reiterate, the corridor 406 can be initiated by the user 102 to limit the fuel stop search results by displaying only potential fuel stop airports that fall within the specified corridor 406 along the air travel trip route 401. While visible lines are drawn in FIG. 4 to indicate the approximate area of the corridor 406, in other embodiments the lines need not be present but potential fuel stop airports within the corridor 406 may nonetheless be indicated, while those airports not lying within the specified corridor 406 may be neglected. If the corridor 406 were not generated, all potential fuel stop airports around the world would be displayed, including airports not necessarily within the desired trip route direction.

In the illustrated exemplary embodiment, the corridor 406 was generated using the 250 NM option from the Range Distance filter 242 (FIG. 2). As graphically displayed, the corridor 406 is defined by a 250 NM parallel offset on each side of the line denoting the air travel trip route 401, thus creating a 500 NM "tunnel" where potential fuel stops that meet the user 102 criteria as defined with reference to FIG. 2 are shown. The corridor 406 feature may prove advantageous by eliminating potential fuel stops that may be economically or practically infeasible to reach.

The map GUI 400 may further include navigation tools 408 configured to allow the user 102 to manually manipulate the geographic view. For example, the navigation tools 408 may include directional tools 410 and a magnifying tool 412. The directional tools 410 may allow the user 102 to alter the general disposition of the illustrated globe view in all directions corresponding to the direction of the illustrated arrows. The magnifying tool 412 may allow the user 102 to zoom in or out of a particular geographic view. The map GUI 400 may also be configured to allow the user 102 to click anywhere on the map and have the view of the map rotate to that particular spot. Moreover, the user 102 may be capable of clicking and dragging the mouse to rotate the map so as to manipulate the specific global view.

Still referring to FIG. 4, the results of the fuel price request graphically returned a total of five potential fuel stops prior to reaching London, UK (i.e., EGGW). The potential fuel stops include airport ICAO codes EINN (corresponding to Shannon International Airport in Rineanna Ireland), EGPH (corresponding to Edinburgh, Scotland), EGPF (corresponding to Glasgow, U.K.), EGPK (corresponding to the Glasgow Prestwick Airport, U.K.), and EGLF (corresponding to Farnborough Airport, Farnborough, U.K.). To obtain detailed information concerning each airport, the user 102 may pass the cursor of the mouse over a particular ICAO code on the map GUI 400 which may initiate a pop-up box to appear (not shown). The pop-up box may include information substantially similar to the data displayed in the Tech Stop Analyzer Result GUI 300 described with reference to FIGS. 3A and 3B.

Figure 5:
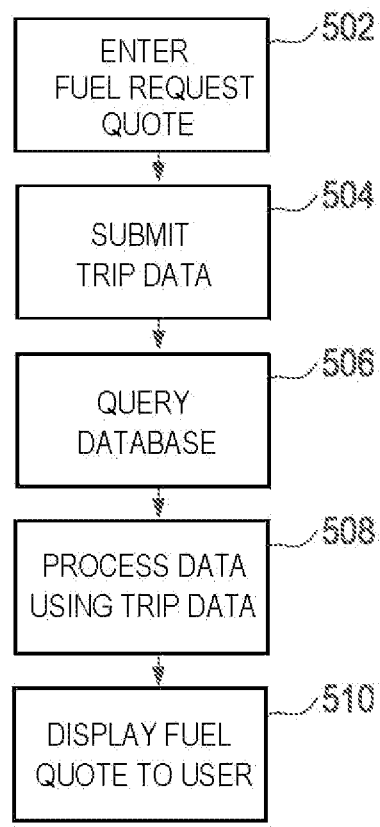
FIG. 5 illustrates a schematic diagram of a method of automatically retrieving aircraft fuel pricing, according to one or more embodiments of the disclosure.

Referring to FIG. 5, with continuing reference to FIGS. 1 and 2, illustrated is a schematic of a method of operating a system 100 to provide fuel price quotes to a user 102 for at least one air travel trip having at least two trip legs. After logging onto the system 100, a user may initiate communication with the OC 110 by entering a fuel quote request related to an air travel trip, as at 502. The system 100 may be provided by a flight operations service provider, and logging onto the system 100 may encompass entering a username and password into a user interface 104, such as a desktop computer, so that the system 100 may recognize the particular user 102. Entering the fuel quote request may include inputting various filter criteria into a graphical user interface displayed on a monitor as part of the user interface 104, as described above with reference to FIG. 2. For example, the user 102 may: enter departure/destination cities 204; select a specific aircraft 214, 216; adjust the preferred air speed 210 during the flight; determine a desired refueling distance or time from the destination city 222, 224; select to filter the results to within the range of the destination airport 228; select to filter the results to preferred fuel stops of the flight operations service provider 230; select to filter the results to previously visited airports 232; limit the results to airports with runways of a certain length 236; limit the results to military airports 238; limit the results to airports offering varying fuel pricing for either charter ("135") or private ("91") flights 240; and/or select to limit the search results to a defined corridor 242 where potential refueling locations will limited to within the defined corridor.

The user 102 may then submit the fuel quote request to the FAS 106 through a network 108, as at 504. The FAS 106 may be configured to process the request by first querying the various data stored in at least one database, as at 506. In one embodiment, the FAS 106 may query data stored in a plurality of databases, such as an Airport Database 112, an Aircraft Performance Database 114, and/or a Fuel Table Database 116. Querying the databases 112, 114, 116 may generally include accessing and retrieving air travel data stored therein corresponding to the filter criteria entered by the user 102 in step 502. In at least one embodiment, air travel data may include pertinent airport, aircraft, and fuel pricing data.

Once retrieved by the FAS 106, a data engine DE 118 may then be configured to process the retrieved data using the fuel quote request with the filter criteria, as at 508. In particular, the DE 118 may be configured to retrieve, process, and report all fuel pricing for the various potential fuel stop airports that fit the filter criteria entered by the user 102. A render engine (RE) 120 may then be configured to provide the user 102 with a graphic or animation of the fuel pricing report for the various potential fuel stop airports, as at 510. In particular, the RE 120 may be configured to process, or convert, the results of the data processing undertaken by the DE 118 into visible graphic images for user 102 reference via the user interface 104. In at least one embodiment, the RE 120 may provide an Analyzer Result GUI 300 as shown in FIGS. 3A and 3B and discussed above. In at least another embodiment, the RE 120 may provide a geographic map 400 (FIG. 4) of the relevant portions of the globe which indicate potential fuel stops falling within the filter criteria of the user 102 between the departure and destination airports.

As can be appreciated, the present disclosure may be able to quickly and automatically retrieve fuel pricing quotes for private air travel. Consequently, a user 102 may bypass the current time-consuming process of drawing up a flight plan and figuring out where and when to refuel in light of such variables as aircraft endurance, fuel economy, safety, and the numerous options in refueling locations.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A system for providing a fuel price quote for at least one air travel trip having at least two trip legs, comprising:
   at least one user interface configured to receive a fuel price request including filter criteria related to the at least two trip legs;
   at least one database installed at an operational center and being recorded on a non-transitory computer-readable medium and configured to store and update air travel data; and
   a fuel analyzing system installed at the operational center and communicably coupled to the at least one user interface via a computer network and to the at least one database, the fuel analyzing system including at least one server having at least one processor configured to process the fuel price request according to the filter criteria, the fuel analyzing system comprising:
   a data engine configured to:
      process the air travel data in the at least one database to obtain a maximum fuel endurance for an aircraft selected for the at least one air travel trip, and
      process the fuel price request into the fuel price quote, wherein the fuel price quote includes aircraft fuel pricing available at airports located along the at least two trip legs that match the filter criteria; and
   a render engine communicably coupled to the data engine and configured to:
      convert the fuel price quote into a geographic map graphical user interface viewable on the at least one user interface, the geographic map graphical user interface illustrating the at least one air travel trip from origin to destination, and
      process the maximum fuel endurance to display at least one endurance line on the geographic map graphical user interface, wherein the at least one endurance line is radially-offset from the origin and represents a percentage of the maximum fuel endurance for the selected aircraft.

2. The system of claim 1, wherein the at least one user interface is a personal computer or network terminal.

3. The system of claim 1, wherein the at least one database comprises an airport database, an aircraft performance database, and a fuel table database.

4. The system of claim 1, wherein the filter criteria comprises a range distance filter configured to graphically provide corridor of potential fuel stops along the at least two trip legs.

5. The system of claim 1, wherein the air travel data comprises airport, aircraft, and fuel pricing data.

6. The system of claim 1, wherein the geographic map graphical user interface further illustrates potential fuel stops along the at least two trip legs in accordance with the filter criteria.

7. The system of claim 1, wherein the render engine is further configured to convert the fuel price quote into tech stop analyzer result graphical user interface viewable on the at least one user interface.

8. The system of claim 7, wherein the tech stop analyzer result graphical user interface displays aircraft fuel pricing at potential fuel stops along the at least two trip legs in accordance with the filter criteria.

9. A method of providing a fuel price quote for at least one air travel trip having at least two trip legs, comprising:
   entering a fuel price request to a fuel analyzing system having a data engine and a render engine, the fuel price request being entered via a user interface communicably coupled to the fuel analyzing system via a network, the fuel analyzing system including at least one server having at least one processor configured to process the fuel price quote, and the fuel price request comprising filter criteria related to the at least two trip legs;
   querying at least one database communicably coupled to the fuel analyzing system to retrieve air travel data;
   processing the air travel data with the data engine in conjunction with the filter criteria to obtain:
      a maximum fuel endurance for an aircraft selected for the at least one air travel trip from the at least one database, and a fuel price quote comprising aircraft fuel pricing available at one or more potential fuel stops located along the at least two trip legs; and utilizing the render engine to:
  display the fuel price quote as a geographic map graphical user interface viewable on the user interface, the geographic map graphical user interface illustrating the at least one air travel trip from origin to destination, and
  process the maximum fuel endurance to display at least one endurance line on the geographic map graphical user interface, wherein the at least one endurance line is radially-offset from the origin and represents a percentage of the maximum fuel endurance for the selected aircraft.

10. The method of claim 9, further comprising illustrating the one or more potential fuel stops along the at least two trip legs on the geographic map graphical user interface, the one or more potential fuel stops being derived from a range distance filter corresponding to the filter criteria.

11. The method of claim 9, wherein querying at least one database to retrieve air travel data comprises querying an airport database, an aircraft database, and a fuel database to retrieve airport, aircraft, and fuel pricing data.

12. The method of claim 9, further comprising illustrating the one or more potential fuel stops on the geographic map graphical user interface.

13. The method of claim 9, wherein displaying the fuel price quote comprises displaying aircraft fuel pricing at the one or more potential fuel stops along the at least two trip legs in accordance with the filter criteria.

14. A method of providing a fuel price quote for air travel, comprising:
  accessing a fuel analyzing system with a user interface communicably coupled thereto via a network, the fuel analyzing system including at least one server having at least one processor configured to process the fuel price quote;
  entering a fuel price request on a first graphical user interface provided by the fuel analyzing system, wherein entering the fuel price request comprises:
    choosing a departure city and a destination city;
    selecting an aircraft from a list of generic or saved aircraft;
    selecting to limit potential refueling location search results to a defined geographic corridor surrounding one or more trip legs between the departure and destination cities; and
    submitting the fuel price request to the fuel analyzing system;
  processing the submitted fuel price request using the fuel analyzing system, the fuel price request being processed to retrieve a maximum fuel endurance for the selected aircraft and to retrieve a fuel price quote on a second graphical user interface, the fuel price quote comprising aircraft fuel pricing available at one or more potential fuel stops located between the departure and destination cities;
  displaying a geographic map graphical user interface illustrating the one or more trip legs between the departure and destination cities; and
  processing the maximum fuel endurance to display at least one endurance line on the geographic map graphical user interface, the at least one endurance line being radially-offset from the departure city and representing a percentage of the maximum fuel endurance for the selected aircraft.

* * * * *